March 27, 1928.
L. ROBIN ET AL
1,663,922
ONE-WAY DRIVING MECHANISM
Filed March 3, 1927
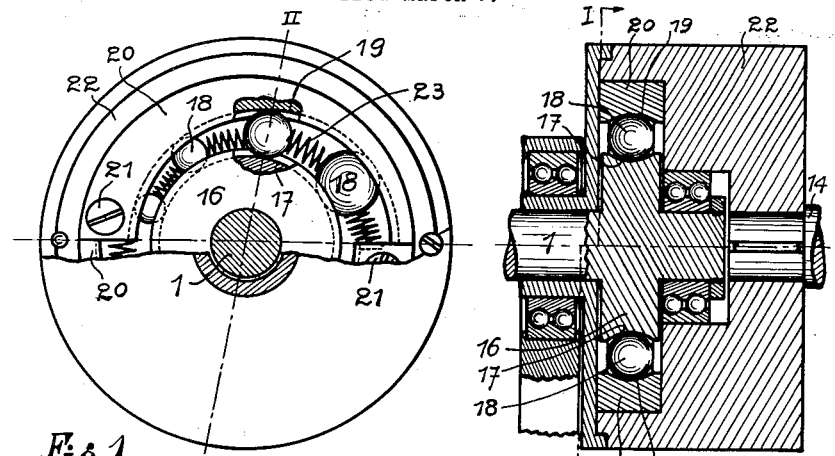
Fig.1
Fig.2
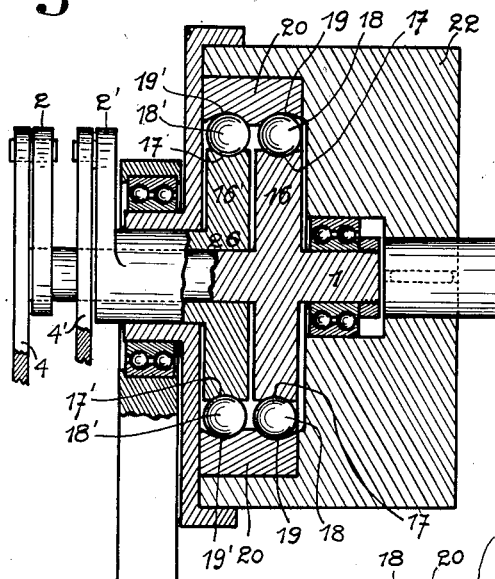
Fig.3
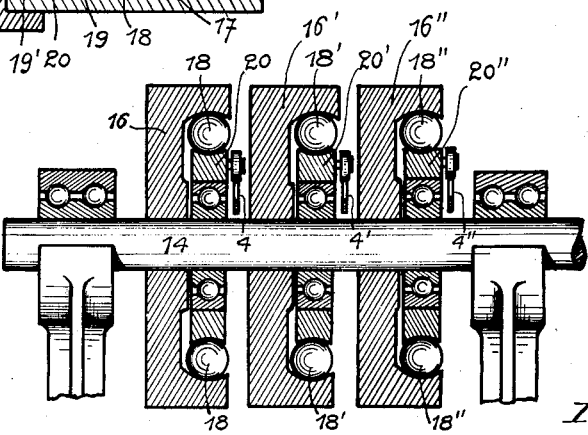
Fig.4
Inventors
Leo Robin
and Philippe de Ponthière
by their Attorney Patented Mar. 27, 1928.

1,663,922

UNITED STATES PATENT OFFICE.

LEO ROBIN, OF IXELLES, AND PHILIPPE de PONTHIERE, OF WOLUWE ST. LAMBERT, BELGIUM.

ONE-WAY DRIVING MECHANISM.

Application filed March 3, 1927, Serial No. 172,485, and in Belgium March 9, 1926.

This invention relates to one-way driving mechanisms, and is especially adapted for use in connection with variable speed power transmission mechanism in which the driving member is oscillated, the amplitude of oscillation being variable in accordance with the desired speed to be transmitted to the driven member.

The one-way driving mechanism according to the present invention is of the type wherein the driving and driven members have track members that are eccentrically disposed in relation to each other and between which are wedged sets of balls of different diameters.

According to the present invention, these balls are spaced apart and held at definite points between the track members by means of springs.

This above construction is particularly applicable to one-way driving mechanisms in which a power is transmitted to the drive by a single oscillating member.

In or for mechanism in which power is transmitted from a plurality of oscillating members, there are provided a plurality of driving members mounted concentrically to each other, each having eccentric tracks, a driven member mounted concentrically to the driving members, and having a track member comprising a plurality of eccentric tracks co-operating with the eccentric tracks on the driving members, and sets of balls wedged between each of the co-operating eccentric tracks, said balls being spaced apart and held at definite points between the co-operating tracks by means of springs.

The invention may also comprise a plurality of independent driving members mounted side by side around the driven member, each driving member being actuated separately by a driving rod and having an eccentric track co-operating with a track of the locking disc, each locking disc being rigidly secured to the driven shaft proper, and sets of balls wedged between each of the co-operating eccentric tracks, said balls being spaced apart and held at definite points between the co-operating tracks by means of springs.

The invention will appear more fully in the course of description of the drawings accompanying the present specification and illustrating several constructions.

Figure 1 is a cross-section through a one-way driving mechanism driven by a single driving member, taken on line I—I of Figure 2.

Figure 2 is a longitudinal section through the same mechanism, on line II—II of Figure 1.

Figure 3 is a longitudinal section through an analogous mechanism driven by means of two cranks.

Figure 4 is a longitudinal section through another constructional form of a mechanism driven by means of three cranks.

Referring to Figures 1 and 2, it will be seen that the mechanism comprises a shaft 1 bearing a disc 16, the peripheral surface of which has a groove 17 which forms a rolling track for balls 18 arranged between the said rolling track or race 17 and another rolling track 19 provided in segments 20, the inner surface of which segments is eccentric relatively to the rest of the mechanism. These segments 20 are fixed by any desired means, for instance, by screws 21, to a drum 22 which is keyed to the driven shaft 14 proper.

The characteristic of this device is that when the mechanism is actuated by an oscillator 2, operated by a driving rod 4, the driving is effected by the series of balls 18 which are of different diameters in accordance with the positions which they occupy in the mechanism. They are held in contact with their rolling tracks by springs 23. This arrangement has the advantage that when the balls wear out, they advance towards the portion of their rolling track of smaller cross-section. Moreover this system allows of the use of small locking angles and consequently entails slight wear only of the balls.

Figure 3 shows a one-way driving mechanism of the same kind as the preceding one, but adapted to be operated by two oscillators. A portion of the mechanism is constructed in the same way as in the case of a single oscillator. The various elements of this portion have the same reference numbers as in the case already described.

The second oscillator 2', which is actuated by rod 4' drives the drum 22 by means of an intermediate disc 16' secured to a sleeve 26 concentric with the shaft 1.

It will be readily understood how the driving mechanism in a single direction operates in the case of more than two cranks. It is only necessary to increase the number of sleeves 26 concentric with the shaft 1.

It may also be replaced by a device in which, unlike that hereinbefore described, the driving device is outside the transmission or driven device (Fig. 4). Such a device is shown by Figure 4 which represents three locking discs 16, 16' and 16'' secured to the driven shaft 14 proper and three eccentric rings 20, 20', 20'' independent of one another, each of these rings being actuated by an associated driving rod 4, 4' or 4''. Locking balls 18, 18', 18'' are disposed between the discs and the eccentric rings.

This construction, among other things, avoids the multiplicity of bushes connecting at present the driving cranks to the locking discs in the event of several driving connecting cranks being used.

Obviously, the invention may also be applied in the case in which the transmission is effected by more than two or three cranks, the examples given in the foregoing being merely by way of illustration and not limitative.

What we claim is:

A one-way driving mechanism comprising driving and driven members having track members eccentrically disposed relatively to each other, and sets of balls of different diameters wedged between the eccentrically disposed track members, said balls being spaced apart and held at definite points between the track members by means of springs.

In testimony whereof we affix our signatures.

LEO ROBIN.
PHILIPPE de PONTHIERE.